United States Patent

Brocato et al.

[11] Patent Number: 5,256,068
[45] Date of Patent: Oct. 26, 1993

[54] SAYING GOODBYE GAME

[76] Inventors: Sally K. Brocato, 1348 Thorpe La. #701, San Marcos, Tex. 78666; George Spector, 233 Broadway Rm 702, New York, N.Y. 10279

[21] Appl. No.: 26,813

[22] Filed: Mar. 5, 1993

[51] Int. Cl.⁵ .................. G09B 19/00; A63F 9/00; A63H 13/16; A63H 3/33
[52] U.S. Cl. ..................... 434/236; 273/459; 446/302; 446/310
[58] Field of Search .................. 273/459; 446/73, 302, 446/310; 434/236

[56] References Cited

U.S. PATENT DOCUMENTS

| 1,979,459 | 11/1934 | Finn | 273/459 X |
| 3,479,101 | 11/1969 | Poor et al. | 446/310 X |
| 4,573,927 | 3/1986 | Newman | 434/236 |
| 4,710,145 | 12/1987 | Vandis | 434/236 |

Primary Examiner—Paul E. Shapiro

[57] ABSTRACT

A good-bye game is provided in which a miniature coffin with a dead body doll is buried, so that a child with the guidance of an adult can read a saying off a card to the dead body doll for teaching the child a way to confront death when a loved one dies.

6 Claims, 1 Drawing Sheet

SAYING GOODBYE GAME

BACKGROUND OF THE INVENTION

The instant invention relates generally to games and more specifically it relates to a saying good-bye game, which provides a child a way to confront death when a loved one dies.

There are available various conventional games which do not provide the novel improvements of the invention herein disclosed.

SUMMARY OF THE INVENTION

A primary object of the present invention is to provide a saying good-bye game that will overcome the shortcomings of the prior art devices.

Another object is to provide a saying good-bye game that is used in conjunction with a sandbox, so that when played by a child, it will teach the child about losing a loved one when they die.

An additional object is to provide a saying good-bye game that can be played by both a child and an adult, so that the adult can help the child get over their grief when the loved one dies.

A further object is to provide a saying good-bye game that is simple and easy to use.

A still further object is to provide a saying good-bye game that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
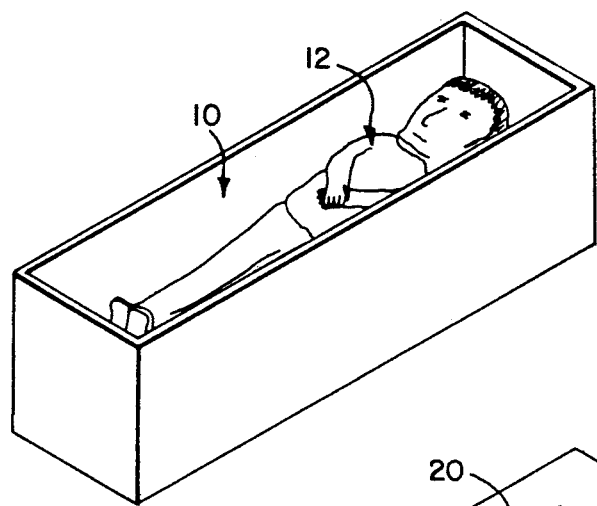
FIG. 1 is a perspective view of a miniature coffin with the dead body doll therein.
Figure 2:
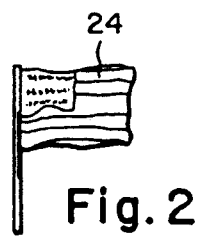
FIG. 2 is an elevational view of one of the miniature flags.
Figure 3:
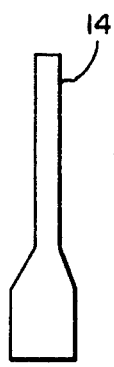
FIG. 3 is an elevational view of one of the miniature shovels.
Figure 4:
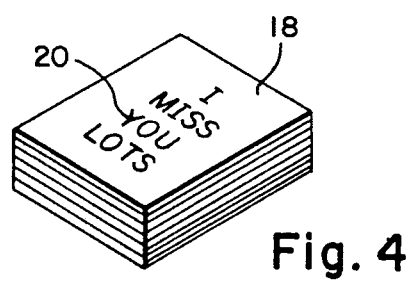
FIG. 4 is a perspective view of the pack of twelve cards.
Figure 5:
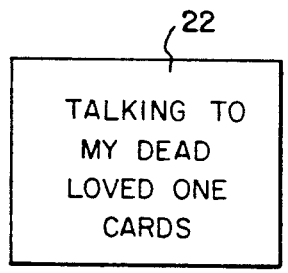
FIG. 5 is an elevational view of the card packet.
Figure 6:
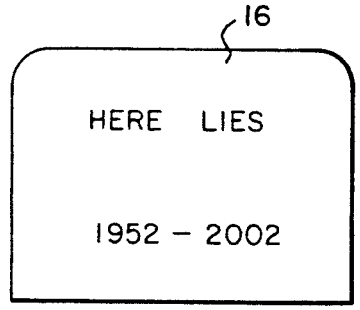
FIG. 6 is an elevational view of the miniature headstone.
Figure 7:
FIG. 7 is a perspective view of one of the bouquet of flowers.

Turning now descriptively to the drawings, in which similar reference characters denote similar elements throughout the several views, FIGS. 1 through 7 illustrates a good-bye game which consists of a miniature coffin 10, with a dead body doll 12 to fit into the miniature coffin 10. At least one miniature shovel 14 is to bury the coffin 10 with the dead body doll 12 within a miniature grave in the ground or in a sandbox, while a miniature headstone 16 is placed at the grave. A plurality of cards 18 are provided, with a different saying 20 on each card 18. A child can read the sayings 20 to the dead body doll 12, thereby teaching the child a way to confront death when a loved one dies.

Figure 8:
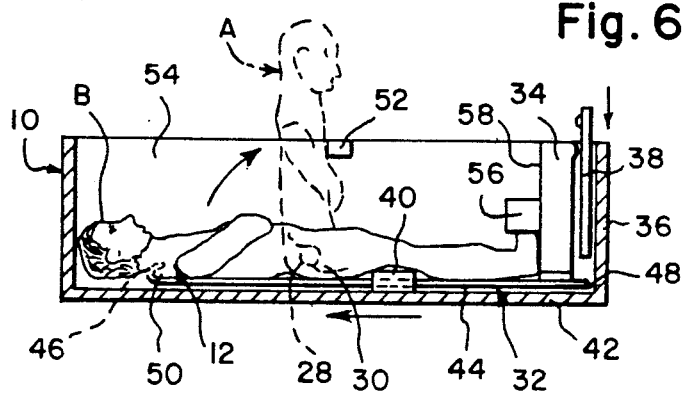
FIG. 8 is a diagrammatic cross sectional view taken through the coffin, showing a modification in which a tape cassette when inserted therein will turn on a tape player and release a retaining mechanism, so that the dead body doll which is spring biased at the hips will be in a sit up position within the miniature coffin.

The good-bye game further includes a card packet 22 to hold the cards 18 therein, at least one flag 24 to be placed at the grave and a plurality of flower bouquets 26 to also be placed at the grave A modification is shown in FIG. 8, in which the dead body doll 12 has a spring biased hinge 28 located at the hips 30, so that the dead body doll 12 will normally be in a sit up position "A" in the miniature coffin 10. A structure 32 is for retaining the dead body doll 12 in a supine position "B" within the miniature coffin 10.

A tape player 34 is mounted vertically within the miniature coffin 10 against a foot portion 36 thereof. A tape cassette 38 having proper funeral music and sayings thereon is provided. The tape cassette 38 is insertable into the tape player 34, which will release the retaining structure 32 to allow the dead body doll 12 to go into the sit up position "A" in the miniature coffin 10, while the tape player 34 is operating.

The retaining structure 32 includes a sleeve 40 mounted onto a bottom 42 of the miniature coffin 10. An elongated rod 44 has a hook end 46 and a tapered cam end 48. The rod 44 slides horizontally within the sleeve 40. The hook end 46 will engage with the back 50 of the dead body doll 12, when the dead body doll 12 is placed in the supine position "B". The hook end 46 will disengage from the back 50 of the dead body doll 12, when the tape cassette 38 engages with and pushes the tapered cam end 48 forward to allow the dead body doll 12 to go into the sit up position "A".

A body stop 52 is mounted to one inner side 54 of the miniature coffin 10. A foot stop 56 is mounted to an inner side 58 of the taper player 34, so as to properly position the dead body doll 12 when in the supine position "B" and in the sit up position "A".

Rules For Playing The Game

1. A child with the assistance of an adult will place the dead body doll 12 into the miniature coffin 14.
2. A hole is dug in the ground or sandbox with a miniature shovel 14 to simulate a grave.
3. The miniature coffin 14 with the dead body doll 12 is then placed into the grave.
4. The grave is filled in and the headstone 16 is placed at the head of the grave.
5. One card 18 is picked and the saying 20 is read by the child to the dead body doll 12 within the game.
6. This will teach the child a way to confront death when a loved one dies.
7. The flag 24 and the flower bouquets 26 are also placed on the grave.
8. If the modified miniature coffin 10 is used a tape cassette 38 is inserted into the tape player 38 before the miniature coffin 10 is placed into the grave.
9. This will cause the modified dead body doll 12 to go into its sit up position "A", while the tape cassette 38 plays proper funeral music and sayings.

The sayings 20 for the cards 18 are typically but not limited to read:

Do you still love me?

I miss you lots.

Are you happy?
Come back here right now!
Why did you leave me?
Can you see me?
I hate you for dying!
I am mad at you for leaving me.
I thought you would always be here.
Did I say "I love you enough?"
Do you miss me?
I wish you were here today.
Other sayings 20 can be substituted if needed.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A good-bye game which comprises:
   a) a miniature coffin;
   b) a dead body doll to fit into said miniature coffin;
   c) at least one miniature shovel to bury said coffin with said dead body doll within a miniature grave;
   d) a miniature headstone to be placed at the grave; and
   e) a plurality of cards, with a different saying on each said card, so that a child can read the sayings to said dead body doll, thereby teaching the child a way to confront death when a loved one dies.

2. A good-bye game as recited in claim 1, further including:
   a) a card packet to hold said cards therein;
   b) at least one flag to be placed on the grave; and
   c) a plurality of flower bouquets to be placed on the grave.

3. A good-bye game as recited in claim 2, further including:
   a) said dead body doll having a spring biased hinge located at the hips, so that said dead body doll will normally be in a sit up position in said miniature coffin; and
   b) means for retaining said dead body doll in a supine position within said miniature coffin.

4. A good-bye game as recited in claim 3, further including:
   a) a tape player mounted vertically within said miniature coffin against a foot portion thereof;
   b) a tape cassette having proper funeral music and sayings thereon, whereby said tape cassette is insertable into said tape player which will release said retaining means to allow said dead body doll to go into the sit up position in said miniature coffin, while said tape player is operating.

5. A good-bye game as recited in claim 4, wherein said retaining means includes:
   a) a sleeve mounted onto a bottom of said miniature coffin; and
   b) an elongated rod having a hook end and a tapered cam end, said rod slides horizontally within said sleeve, whereby said hook end will engage with the back of said dead body doll, when said dead body doll is placed in the supine position and said hook end will disengage from the back of said dead body doll when said tape cassette engages with and pushes said tapered cam end forward to allow said dead body doll to go into the sit up position.

6. A good-bye game as recited in claim 5, further including:
   a) a body stop mounted to one inner side of said miniature coffin; and
   b) a foot stop mounted to an inner side of said tape player, so as to properly position said dead body doll when in the supine position and in the sit up position.

* * * * *